United States Patent
Pochic

(10) Patent No.: US 9,202,214 B2
(45) Date of Patent: Dec. 1, 2015

(54) METHODS AND APPARATUS FOR PROVIDING AND OPERATING AN ENHANCED PAYMENT DISPLAY CARD WITH NETWORK SUPPORT

(71) Applicant: MasterCard International Incorporated, Purchase, NY (US)

(72) Inventor: Sebastien Pochic, Brussels (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/216,120

(22) Filed: Mar. 17, 2014

(65) Prior Publication Data

US 2014/0263626 A1  Sep. 18, 2014

Related U.S. Application Data

(60) Provisional application No. 61/802,164, filed on Mar. 15, 2013.

(51) Int. Cl.
| | | |
|---|---|---|
| G06K 19/00 | (2006.01) | |
| G06Q 20/34 | (2012.01) | |
| G06K 19/077 | (2006.01) | |
| G06K 19/06 | (2006.01) | |
| G07F 7/08 | (2006.01) | |

(52) U.S. Cl.
CPC ........ *G06Q 20/341* (2013.01); *G06K 19/06028* (2013.01); *G06K 19/06112* (2013.01); *G06K 19/07707* (2013.01); *G06Q 20/357* (2013.01); *G07F 7/0846* (2013.01)

(58) Field of Classification Search
USPC .................................................. 235/487, 492
See application file for complete search history.

(56) References Cited

U.S. PATENT DOCUMENTS

| 5,146,067 A | 9/1992 | Sloan et al. |
| 6,045,043 A | 4/2000 | Bashan et al. |
| 2006/0049246 A1* | 3/2006 | Lee .............................. 235/384 |
| 2006/0261174 A1* | 11/2006 | Zellner et al. ................. 235/492 |
| 2009/0078777 A1 | 3/2009 | Granucci et al. |
| 2011/0140841 A1 | 6/2011 | Bona et al. |
| 2011/0295675 A1 | 12/2011 | Reodica |
| 2013/0228616 A1* | 9/2013 | Bhosle et al. ................. 235/375 |

OTHER PUBLICATIONS

"PCT Notification Concerning Transmittal of the International Search Report and the Written Opinion of the International Searching Authority, or the Declaration", Aug. 11, 2014, for International Application No. PCT/US2014/030478, 11pgs.

* cited by examiner

*Primary Examiner* — Matthew Mikels
(74) *Attorney, Agent, or Firm* — Buckley, Maschoff & Talwalkar LLC

(57) ABSTRACT

Pursuant to some embodiments, methods and apparatus for providing and operating an enhanced payment display card with network support are provided.

8 Claims, 8 Drawing Sheets

METHODS AND APPARATUS FOR PROVIDING AND OPERATING AN ENHANCED PAYMENT DISPLAY CARD WITH NETWORK SUPPORT

CROSS-REFERENCE TO RELATED APPLICATIONS

This application claims benefit of and priority to U.S. Provisional Patent Application Ser. No. 61/802,164 filed on Mar. 15, 2013, the contents of which are hereby incorporated by reference in their entirety for all purposes.

BACKGROUND

Traditionally, payment cards (such as credit or debit cards) provide a single function—access to a payment account associated with the payment card. More recently, integrated circuit cards have been introduced which allow payment cards to be provided which have microprocessors and memories thereon, providing an ability to store information about multiple payment accounts on the payment card. It would be desirable to provide improved methods and apparatus for providing and operating a payment card with a display which allows payment network support, allowing payment cardholders to use their payment card in different ways.

DETAILED DESCRIPTION

In general, and for the purpose of introducing concepts of embodiments of the present invention, methods and apparatus for providing and operating an enhanced payment display card with network support are provided. As used herein, the term "display card" refers to a payment or other identification card which is provided with one or more display devices allowing information to be displayed to a user (such as a cardholder). Pursuant to some embodiments, different types of displays and integrated circuit cards may be used with desirable results in conjunction with embodiments of the present invention.

As used herein, the display card will be described for use in conjunction with one or more payment or financial applications, however, those skilled in the art will appreciate that embodiments may be used in conjunction with other applications as well, such as, for example, identification applications or the like. Accordingly, the term "display card" or "identification card" may generally be used interchangeably herein in accordance with some embodiments.

Figure 1:
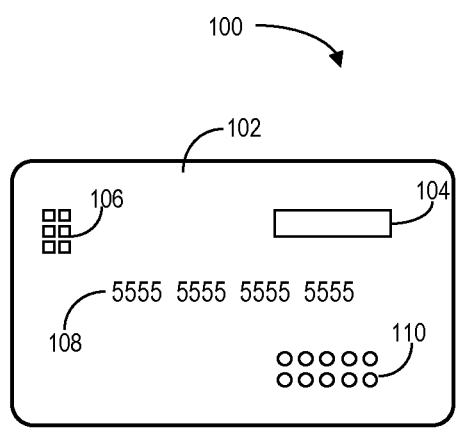
FIG. 1 is a top view of a display card according to some embodiments of the present invention.

As used herein, the phrase "identification card" or "display card" might refer to, for example, a payment card, a credit card, a debit card, a loyalty program card, a badge, a license, a passport card, a radio frequency apparatus, and/or a contactless card. By way of example, FIG. 1 is a top view of a display card face 100 having a substantially planar display device 104 affixed to a card-shaped body 102 according to some embodiments of the present invention. In particular, illustrated is a substantially card-shaped body 102 that might comprise an International Standards Organization/International Electrotechnical Commission ("ISO/IEC") 7810 ID-1 sized card having a thickness of 0.76 mm (0.030 in) and a top area of 85.60×53.98 mm (3.370×2.125 in) with rounded corners having a radius of 2.88-3.48 mm. However, this size and shape are provided for illustrative purposes only—those skilled in the art, upon reading the present disclosure, will appreciate that other shapes, form factors, sizes, and configurations of card-shaped bodies may be used in conjunction with embodiments of the present invention.

Note that the display device 104 might be formed integral with the card body 102. Moreover, the card body 102 and/or display device 104 may be formed of one or more sheets of plastic or other materials. The display device 104 may comprise, for example, a digital display including Light Emitting Diodes ("LEDs"), a thin film display, or the like. In some embodiments, the display device 104 may be a simplified display allowing display of no more than a fixed set number of alphanumeric data (e.g., such as six numbers or characters). In some embodiments, the display device may allow the display of one or more characters, icons or the like. According to other embodiments, the display device 104 is not integral with the card body 102 but instead is affixed to the card body 102 (e.g., via an adhesive). Note that the card body 102 and display device 104 might be formed of different materials. Further note that any of the embodiments described herein might be formed of other materials having appropriate properties, such as strength, luminosity, and/or flexibility.

According to some embodiments, the display card 100 further includes one or more processors, coupled to (or encapsulated in) the card-shaped body 102, executing an operating system. The display device 104 may be coupled to the card-shaped body and in communication with one or more of the processor(s) to provide visual information to a cardholder. The display card 102 may further include one or more storage unit(s) such as a memory device, coupled to (or encapsulated in) the card-shaped body and in communication with the processor(s), to store computer executable program code and data (including, for example, one or more payment applications and display drivers or terminal emulators). Moreover execution of the operating system by the one or more processors may result in selection of one or more items of data or other information to be provided on the display device 104.

According to some embodiments, one or more input devices 110 may be used to enter data, or to select among applications or modes of operation. In some embodiments, the input devices 110 may include a number of keys or buttons. For example, in some embodiments, twelve keys or buttons may be provided, each corresponding to an alphanumeric value or an input selection. In other embodiments, a single button or key may be provided to activate or deactivate a function or application. In other embodiments (as will be briefly described in conjunction with FIG. 3 and certain process flow diagrams shown below), multiple buttons or keys may be provided, each corresponding to one or more applications, commands or functions.

In some embodiments, the display card 100 may have multiple modes of communication. For example, a set of contacts 106 may be provided to allow contact communication with a terminal or other reader device.

In some embodiments, the display card 100 may have a wireless or contact communication interface, allowing remote or contactless communication between the display card 100 and a terminal or other reader device. Display cards 100 having an ability to perform such contactless communication are provided with an antenna (not shown) for conducting contactless communication using, for example, radio frequency ("RF") electromagnetic waves. An oscillator (or oscillators) and additional circuitry for one or more of modulation, demodulation, down-conversion and the like may further be provided. Pursuant to some embodiments, the display card 100 has both contact and contactless modes of operation as will be described further herein.

In some embodiments, the display card 100 is configured as a dual-interface device having both contact and contactless modes of operation as will be described further herein. Pursuant to some embodiments, the contact and contactless modes of operation may be performed in accordance with one or more standards, such as those set forth in ISO/IEC 7816 and ISO/IEC 14443 or the like. Further, the display card 100 may be configured to operate in accordance with one or more payment application standards such as the EMV standards promulgated by EMVCo, LLC. However, those skilled in the art, upon reading the present disclosure, will appreciate that other payment and transaction standards may be used in conjunction with features of the present invention. For the purposes of describing and illustrating features of some embodiments, the display card 100 will be described herein as being compliant with the EMV standards. The EMV standards define the interaction at the physical, electrical, data and application levels between IC cards and IC card processing devices for financial transactions.

Figure 2:
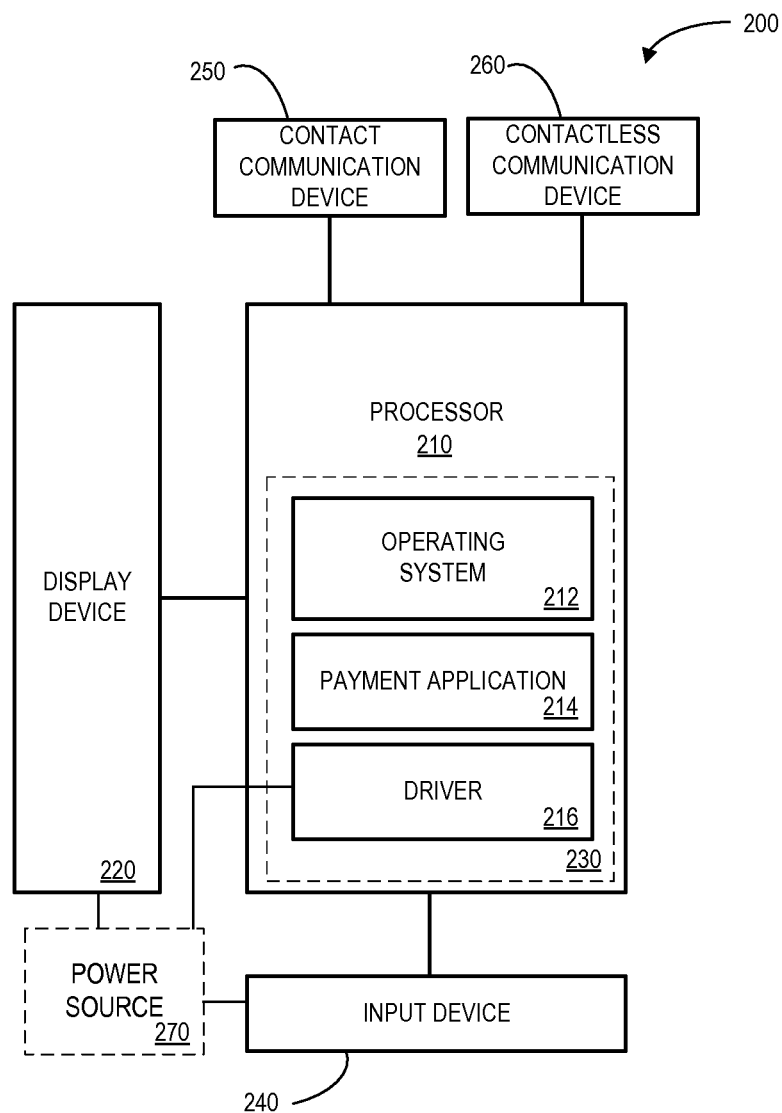
FIG. 2 is a block diagram view of components of a display card such as the display card of FIG. 1 pursuant to some embodiments.

The embodiments described herein may be implemented using any number of different hardware configurations. For example, FIG. 2 illustrates a display card 200 that may be, for example, associated with the one described in connection with FIG. 1. The display card 200 comprises a processor 210, such as one or more commercially available Central Processing Units (CPUs) in the form of one-chip microprocessors, coupled to a contact communication device 250 and/or a contactless communication device 260 allowing communication between the processor 210 and a contact or contactless reader or terminal (not shown in FIG. 2) which may further be in communication with a payment network (not shown in FIG. 2) to allow enhanced display and device operation using payment network support as will be further described herein. For example, contact communication device 250 may include circuitry and components allowing the display card 200 to communicate with a terminal or reader device using contact communications technologies (e.g., pursuant to ISO/IEC 7816 or the like). Similarly, the contactless communication device 260 may include circuitry and components allowing the display card 200 to communicate with a terminal or reader device using contactless communications technologies (e.g., pursuant to ISO/IEC 14443 or the like). The communication devices 250, 260 may be used to communicate, for example, with one or more remote devices (not shown in FIG. 2, but described in FIG. 3). The display card 200 further includes an input device 240 (e.g., one or more switches or keys) and a display device 220.

The processor 210 also communicates with a storage unit 230. The storage unit 230 may comprise any appropriate information storage unit, including combinations of persistent or non-persistent storage units such as semiconductor memory devices. The storage unit 230 stores a program and/or instructions associated with an operating system for controlling the processor 210 as well as one or more payment applications 214 and display drivers 216. The processor 210 performs instructions of the programs 212, 214, 216 and thereby operates in accordance with any of the embodiments described herein. In some embodiments, the processor 210 includes one or more secure elements that are personalized or configured to allow the processor 210 to function as a payment chip pursuant to a standard such as the EMV standard.

While a single processor 210 is shown in FIG. 2, in some embodiments, two or more processors may be provided on the display card 200. For example, one processor may be provided to perform standard payment chip processing, while a second processor may be provided to control the driver 216 as well as to interface with the input device 240 and the display device 220. In such embodiments, the second processor interacts with the first processor using an interface or communications bus (not shown in FIG. 2). In some embodiments, the second processor (operating in conjunction with the driver 216, the input device 240 and the display device 200) functions to emulate certain functions that would typically be performed by a terminal device or reader in communication with the payment card. Such embodiments allow the display card 200 of the present invention to perform a number of functions that previously would have required the card to be in communication with a terminal or reader device. As used herein, the term "payment chip" may be referred to the processor used to perform payment application processing (e.g., pursuant to the EMV standards).

Whether multiple processors or a single processor are provided, pursuant to some embodiments, the display drivers 216 are configured to function, at least in part, as a terminal emulator, allowing the drivers 216 to communicate with the processor and payment application(s) to obtain data that the payment applications do not have, or that the payment applications cannot compute. As an example, in an embodiment where the payment applications are configured to operate in compliance with the EMV payment standard set forth by EMVCo, LLC, many transactions or operations require that the payment application or payment chip transmit messages (such as messages including cryptograms or the like) to a terminal or reader device. The terminal or reader device performs operations on the message received from the payment card and returns results or information pursuant to the EMV standard. Embodiments of the present invention allow some transactions or operations to be performed by the driver 216 instead of a terminal. That is, the driver 216 operates as a terminal emulator for certain functions.

In some embodiments, the processor 210 may perform instructions allowing the display card 200 to perform one or more services using the display device 220 and/or the input device 240 using data received from a terminal or reader device (received through the contact communication device 250 and/or the contactless communication device 260). For example, the display card 200 may be used to perform a balance display service, where a financial institution associated with the issuance of the display card 200 (or an application associated with the display card 200) is able to provide the cardholder with information associated with the cardholder's current account balance. The account balance may be a financial balance, a loyalty or reward point balance, or the like. As will be described further herein, the data associated with the cardholder's balance may be provided by the issuer or other entity over a payment network, and provided to the display card 200 when the display card 200 is in communication with the payment network (e.g., when the display card 200 is in communication with a terminal or other reader device that is in communication with the payment network).

As another example, the display card 200 may be used to perform a remote authentication service. For example, such a service may allow an issuer of the display card 200 (or an application on the display card 200) to provide the cardholder with an ability to use the display card 200 (including the display device 220 and the input device 240) to perform secure e-commerce or online banking (or other transactions), without the need to have a separate key fob or authentication device. Again, embodiments use payment network data to allow communication of data associated with the authentication service between the display card 200 and a remote entity (such as an issuer or authentication service), while allowing the cardholder to enter data using the input device 240 and view data using the display device 220.

Pursuant to some embodiments, the display card 200 also may include a battery or other power source 270 allowing the display driver 216, the display 220 and other elements to be operable even when the display card 200 is not connected to a terminal or reader device. In some embodiments, to reduce power consumption, most of the information to be displayed on the display device 220 may be stored in the display driver 216 so that the payment chip need not be powered up each time the information is needed (particularly when the display card 200 is not in communication with a reader or terminal). In some situations (e.g., when an authentication service or other application relies on cryptograms computed by the payment application), the chip may be powered by the internal battery and the display driver may then interact with the payment application.

The programs described herein may be stored in a compressed, uncompiled and/or encrypted format. The programs may furthermore include other program elements, such as an operating system, a database management system, and/or device drivers used by the processor 210 to interface with peripheral devices. The storage unit 230 may include different types of memory, such as volatile and non-volatile memory and read-only and programmable memory. The storage unit 230 can store transaction card data such as, for example, a user's Primary Account Number ("PAN"). The storage unit 230 can store the operating system of the display card 200. The operating system may load and execute applications and provide file management or other basic card services to the applications. In some embodiments, one or more applications may "sit" directly on hardware, that is, may be outside the domain of the operating system. One operating system that can be used to implement the invention is the MULTOS® operating system licensed by StepNexus Inc. Alternatively, JAVA CARD® based operating systems, based on JAVA CARD® technology, or proprietary operating systems available from a number of vendors, could be employed. Preferably, the operating system is stored in read-only memory ("ROM") within storage unit 230. In an alternate embodiment, flash memory or other non-volatile and/or volatile types of memory may also be used in the storage unit 230. In addition to the basic services provided by the operating system, the storage unit 230 may also include one or more applications as described herein. At present, one preferred standard to which such applications may conform is the EMV payment standard set forth by EMVCo, LLC.

As used herein, information may be "received" by or "transmitted" to, for example: (i) the display card 200 from another device; or (ii) a software application or module within the display card 200 from another software application, module, or any other source (e.g., a transaction may involve data "received" by or "transmitted" or between the driver 216 and the payment application 214).

Figure 3:
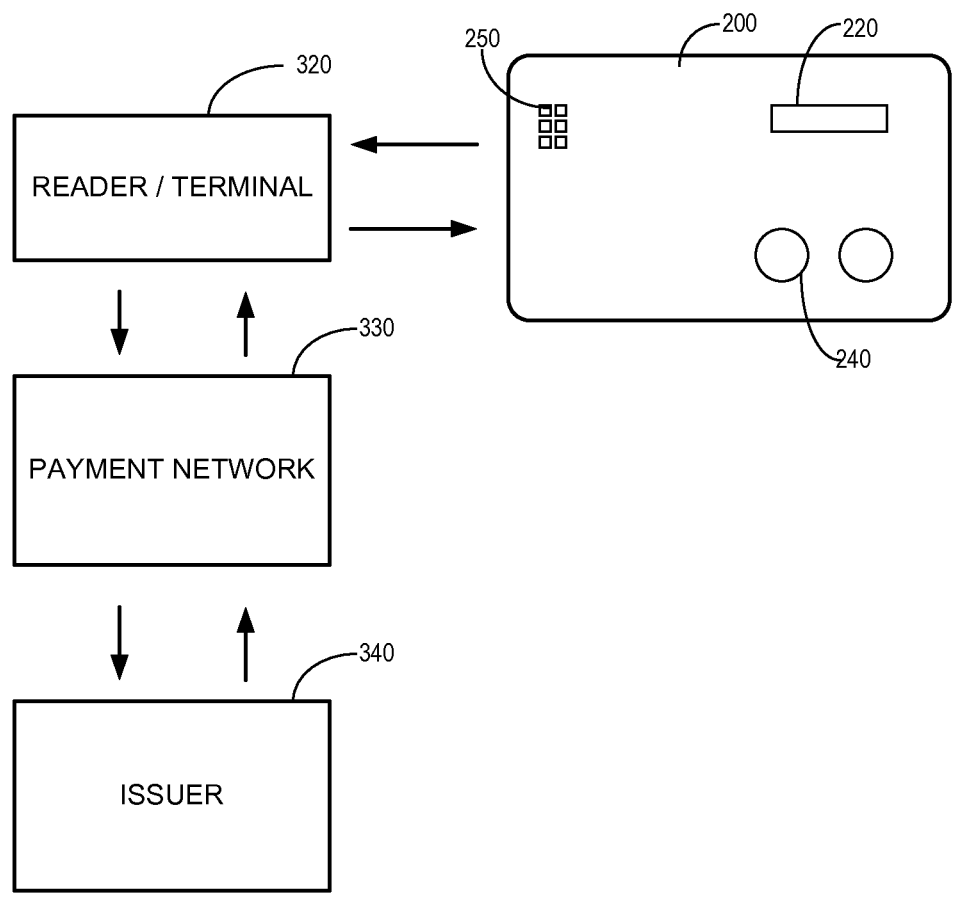
FIG. 3 is a block diagram view of components involved in a display card transaction pursuant to some embodiments.

Reference is now made to FIG. 3, where a transaction system 300 pursuant to some embodiments is shown. The transaction system 300 involves a number of components, including a display card 200 (such as the display card described above in conjunction with FIG. 2) in communication with a reader/terminal device 320 (via contact and/or contactless communication). The reader/terminal device 320 is in communication with one or more payment networks 330 (such as, for example, the BANKNET system operated by MasterCard International Incorporated or the like) to transmit and receive information to and from one or more issuers 340.

A number of different types of readers/terminal devices 320 may be employed within system 300 pursuant to some embodiments. Such readers/terminal devices 320 can include contact readers configured to interact with a contact-type display card 200, wireless or contactless readers configured to interact with a contactless-type display card 200, and combined terminals. Such combined readers/terminal devices 320 are designed to interface with either (or both) contact and contactless-type display cards 200. While not shown in FIG. 3, the reader/terminal devices 320 may include a memory and one or more processors. Pursuant to some embodiments, the devices 320 are configured to conform to the EMV standards, allowing the devices 320 to interact with display cards 200 pursuant to those standards. Pursuant to some embodiments, the driver software (not shown in FIG. 3), interacting with the display 220 and input devices 240 allow the display card 200 to perform certain applications or functions previously performed by readers/terminal devices 320, allowing cardholders of display cards 200 to perform many applications or functions by directly interacting with the display card 200 in a manner previously unavailable.

A number of such applications or functions that may be performed using a display card 200 (as shown in FIG. 2) configured pursuant to the present invention will now be described by referring to flow diagrams at FIGS. 4-8. In each of the flows described herein, an environment is described in which the display card 200 is configured to operate pursuant to the EMV standards—those skilled in the art will appreciate that similar flows may be performed in other environments to allow the display card 200 to function pursuant to other payment or transaction standards.

In a first example, to be described by reference to FIG. 4, operation of a display card (such as display card 200 of FIG. 2) in a payment system (such as the system 300 of FIG. 3) is described in which the display card 200 is used to cause data provided by the cardholder to the display card 200 to be communicated to an issuer 340 (e.g. such as the financial institution that issued a payment application 214 of the display card 200).

Figure 4:
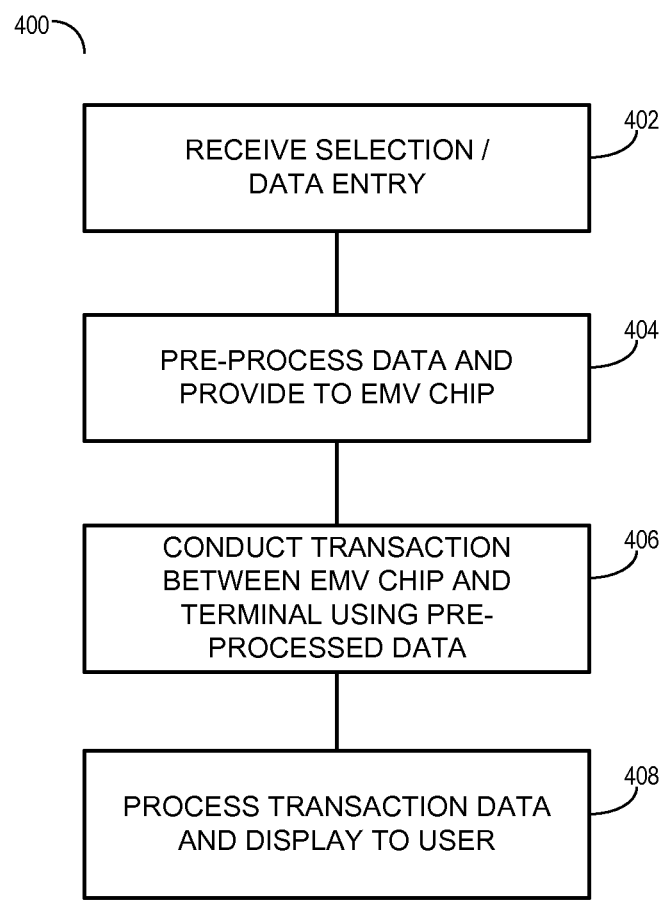
FIG. 4 is a flow diagram of a process conducted by a display card pursuant to some embodiments.

In the process of FIG. 4, a user (such as a cardholder) of a display card 200 interacts with the input device 240 and display device 220 to enter data or to perform a selection, and the display card 200 processes the received data or selection to cause data and messages to be transmitted to an issuer 340 (or other remote entity, such as an agent of an issuer or the like) over a payment network 320. For example, an illustrative example in which the display card 200 is configured with a fleet services application will be described. In the fleet services embodiment, a plurality of display cards 200 may be issued to drivers of vehicles in a fleet (e.g., such as truck drivers or delivery drivers). Each driver is assigned a driver identifier and is responsible for tracking his or her mileage and other information. In such an embodiment, a driver who has been issued or provided with a display card configured pursuant to the present invention may interact with the display card 200 to select (using the input device 240) the fleet management application. The driver 216 may receive the input selection and cause information to be displayed to the cardholder prompting the cardholder to enter information such as the driver's ID, the mileage, etc. In response to each prompt, the cardholder may enter the required information (using the input device 240). The driver 216 causes the entered information to be stored in a payment application or other application associated with the display card 200. When the card is in communication with a reader device (such as a terminal 320), the reader may receive the entered data (such as the driver's ID and mileage) and request any additional authentication data from a payment application (such as an EMV application) on the display card 200. Once the authentication and required cryptograms have been processed by the reader or terminal, the terminal may transmit the full set of data to an issuer or other processing entity for further operation on the data (e.g., to process or record driver information for a fleet management system).

Referring again to FIG. 4, such a process may be performed as follows. First, the cardholder or other user provides data or a selection (by interacting with the input device 240 which may or may not be guided by one or more prompts displayed on the display device 220) that is received by the display card 200 at step 402. More particularly, the selection or data entry may be received by the driver 216 on the display card 200. The driver 216 then pre-processes the received data to create one or more messages or instructions that are provided to the payment application 214 on the display card. For example, the driver 216 may create one or more EMV-compliant messages to cause the payment application 214 to receive the data. Processing continues at 406 where the display card 200 interacts with a reader or terminal device 320 to conduct a transaction involving the data received at 402. In some embodiments, the interaction at 406 may be a standard EMV (or other payment or transaction standard) transaction. However, pursuant to some embodiments, some of the data involved in the transaction processing at 406 is received from cardholder interaction with the display card 200. Such processing provides a number of advantages and benefits. For example, processing at 402 (and, in some embodiments, 404) may occur prior to the interaction at 406. For example, continuing the illustrative example introduced above, a driver in a fleet management system may enter his driver ID and other information by interacting with the input device 240 and display device 220 prior to presenting the display card 200 at a transaction terminal 320. The data entered by the cardholder may be stored or cached in memory associated with the driver 216 for use when the display card 200 is next presented to a reader/terminal device 320. In some embodiments, once the transaction between the display card 200 and the reader/terminal 320 is completed, a confirmation message or other information may be displayed to the cardholder at 408. For example, in the fleet management example introduced above, processing at 408 may include presenting a message to the cardholder informing the cardholder that the entered mileage information was successfully transmitted to the fleet management system (or an issuer associated with the fleet management system). In some embodiments, the display of data to the cardholder is performed under control of the driver 216 based on information received from the payment application 214. For example, the payment application may receive data or information from a reader/terminal 320 that is processed by the payment application 214. The driver 216 may operate on the received information to determine an appropriate message for display to the cardholder at 408. In some embodiments, the message for display to the cardholder at 408 may include data received from the issuer 340 or from other entities associated with the payment network 330.

Those skilled in the art, upon reading the present disclosure, will appreciate that similar processing may be used in other transactions or applications. For example, in some embodiments, the operation of the display card 200 as described herein may be considered to be a "pull" mode of operation, wherein the cardholder's interaction with the display card 200 may set one or more flags or data conditions which are then transmitted to a reader/terminal 320 for further processing (including, for example, processing by the reader/terminal 320 to calculate or provide a response, or forwarding of the information to a remote entity such as an issuer 340 for further processing). Other embodiments or applications will become apparent from the following embodiments.

Figure 5:
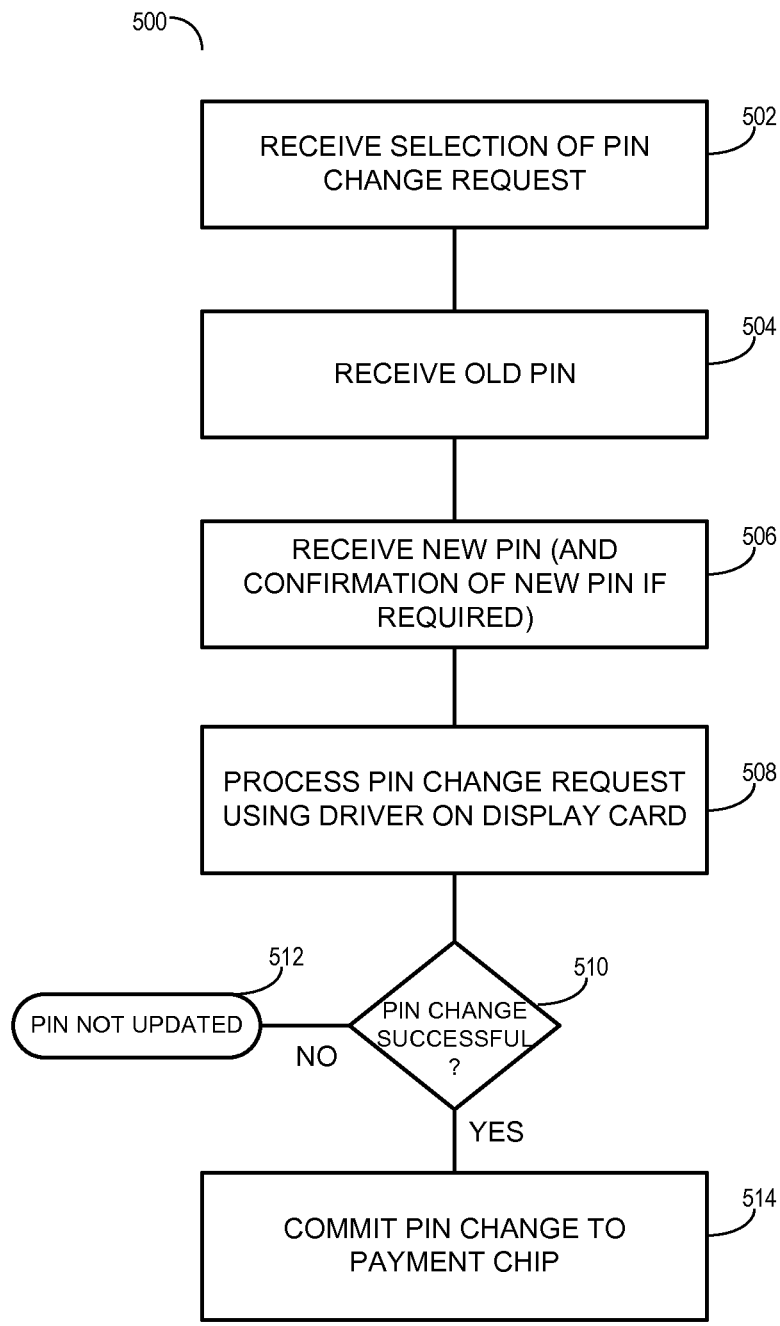
FIG. 5 is a flow diagram of an example PIN change process conducted by a display card pursuant to some embodiments
Figure 6:
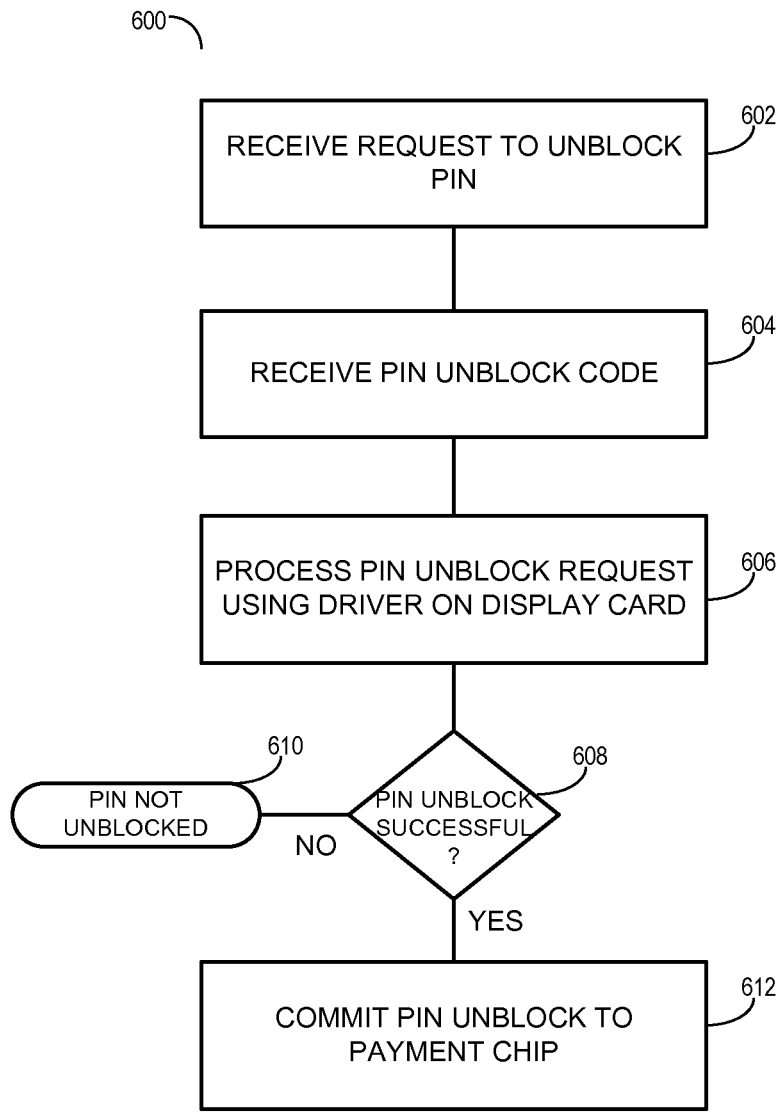
FIG. 6 is a flow diagram of an example PIN unblock process conducted by a display card pursuant to some embodiments.

Referring now to FIG. 5, a process 500 for operating a display card 200 to perform a personal identification number ("PIN") update transaction will be described. Currently, many payment applications, including those compliant with the EMV standards, allow a cardholder to update a PIN associated with a payment application. However, in existing applications, the cardholder must connect a payment card to a terminal or reader to perform the PIN update transaction. Embodiments allow a cardholder to perform a PIN update transaction by interacting with an input device 240 and display device 220 of a display card 200. Further, embodiments allow such processing to be performed in a way that is substantially compliant or compatible with existing payment standards (such as the EMV standard).

Process 500 begins at 502 where a cardholder interacts with an input device 240 and display device 220 of a display card to instruct the display card 200 to perform a PIN change request function. For example, such selection may occur in response to a cardholder selecting a function key (e.g., such as a dedicated input device 240) or by navigating a menu of options displayed on a display device 220 of the display card 200. Once the desired option is viewed on the display device 220, the cardholder may depress or select a button or key to cause the driver 216 to determine that a PIN change request function has been requested.

Processing continues at 504 where the driver 216 causes the display device 220 to prompt the cardholder to enter the cardholder's old (or existing) PIN. The cardholder enters the old PIN using the input device 240. The data is received and stored (in a secure memory area, for example) under control of the driver 216, which then causes the display device 220 to prompt the cardholder to enter the cardholder's desired new PIN. The cardholder enters the new PIN using the input device 240, and the data is received and stored under control of the driver 216. In some embodiments, processing at 506 may include prompting the cardholder to reenter the new PIN to ensure the first entry was correct.

Processing continues at 508 where the driver 216 processes the PIN change request. In some embodiments, the driver 216 processes the PIN change request by effectively emulating certain actions that would have been performed by a reader/terminal device 320. For example, in an EMV environment, the driver 216 performs an EMV VERIFY command to confirm that the old PIN (entered at 504) was correct. The VERIFY command is transmitted to the payment application 214 and the payment application 214 processes the VERIFY command (which includes the old PIN entered at 504) to compare the received PIN with the PIN stored in the display card 200 (e.g., in a secure element associated with the payment application 214). The payment application generates a response to the VERIFY command and provides the response to the driver 216. If the old PIN entered at 504 matches the stored old PIN, the process 500 can continue at 506 where the driver 216 prompts the cardholder to enter their desired new PIN. Once the new PIN is received by the driver 216 (and after any confirmations have been completed), the driver 216 is operated to generate a message for delivery to the payment application 214. If the driver 216 is able to complete the request to change the PIN (e.g., the old PIN was entered properly, and the new PIN and confirmation of new PIN matched), processing continues at 514 where the driver 216 interacts with the payment application 214 to cause the PIN change to be committed to the payment chip/payment application. For example, in an EMV environment, the driver generates an EMV PIN CHANGE UNBLOCK command and transmits the new PIN to the payment application in conjunction with the command. The payment application 214, upon receipt of the PIN CHANGE UNBLOCK command, performs normal EMV processing to update the cardholder's PIN to the new PIN. In the event the driver 216 is unable to determine that the PIN change request is successful (e.g., the old PIN entry was incorrect or other processing conditions prevent the PIN change from being committed), processing continues at 512 and the PIN is not updated in the payment application (although in some embodiments, the driver 216 may cause a display to be rendered prompting the cardholder to retry the PIN change).

Similar processing may be performed for other commands and functions that would normally be handled by a payment card in communication with a reader or terminal device. Another illustrative example will now be provided by reference to FIG. 6 where a process 600 is shown for utilizing features of the display card 200 to perform a PIN unblock transaction. In previous chip card systems, if a cardholder unsuccessfully attempts to enter their PIN through a terminal or other reader too many times, the chip card may be blocked or locked to prevent potential unauthorized use of the card. A cardholder could reset or unblock the PIN by interacting with a terminal or reader. Pursuant to some embodiments of the present invention, such a PIN unblock may be performed without interaction of a terminal or reader—instead, the PIN unblock may be performed directly on the display card 200.

Processing begins at 602 where the display card 200 receives a request to unblock the PIN associated with a payment application 214 on the display card 200. The request may be received after displaying a "PIN BLOCKED" or other similar message to the cardholder via display device 220. The driver 216 may cause a series of displays to be shown to the cardholder instructing the cardholder to interact with the input device 240 to choose to perform a PIN unblock transaction.

Processing continues at 604 where the display card 200 receives a PIN unblock code from the cardholder (entered via the input device 240). The PIN unblock code may include a personal secret or key selected by the cardholder during payment application issuance or personalization which allows the cardholder to perform a PIN unblock transaction. Processing continues at 606 where the display card 200 processes the PIN unblock request using the driver 216. For example, the driver 216 may be programmed to perform EMV or other processing typically performed by a terminal or reader during a PIN unblock transaction which may include generating an EMV PIN CHANGE/UNBLOCK message including the PIN unblock code received at 604. Processing at 608 may include a determination whether the driver 216 has received a correct or valid PIN unblock code. If not, processing may terminate at 610 without having unblocked the PIN (that is, the payment application may be locked from further use until a valid PIN unblock transaction occurs). If a correct or valid PIN unblock code is received, processing may continue at 612 where the driver 216 transmits the PIN CHANGE/UNBLOCK message to the payment application 214 to commit the PIN unblock command to the payment application. Further processing may also include the payment application 214 responding with a success message to the driver 216, which may cause a message to be displayed to the cardholder via the display device 220.

Embodiments may support other application scenarios as well. For example, referring now to FIG. 7, a process 700 may be executed by the display card 200 to allow a cardholder to perform a selection of a desired application on the display card 200. For example, several payment applications may be stored on the display card 200 (including payment application 214 and one or more additional payment applications not shown in FIG. 2). As a specific illustrative (but not limiting) example, a credit application and a debit application may be provided on a single display card 200. Embodiments of the present invention, using a process such as that shown in FIG. 7, allow a cardholder to select which application is to be used in a given transaction.

Process 700 begins at 702 where the display card 200 receives an application selection request from the cardholder (e.g., by the cardholder interacting with input device 240 to perform a selection of a desired application). For example, the display card 200 may display a message such as "PRESS 1 FOR CREDIT", or "PRESS 2 FOR DEBIT" and the cardholder may select a key or switch of the input device 240 to select the desired application. As another example, several keys or switches may be provided on a display card 200 such as illustrated in FIG. 3. Each key or switch may be labeled as being associated with a different application (e.g., one switch may be labeled as "DEBIT" and the other as "CREDIT"). Those skilled in the art will appreciate that a wide variety of combinations and types of input devices 240, displays and messages may be provided to guide a cardholder through a selection process to select a desired application.

Figure 7:
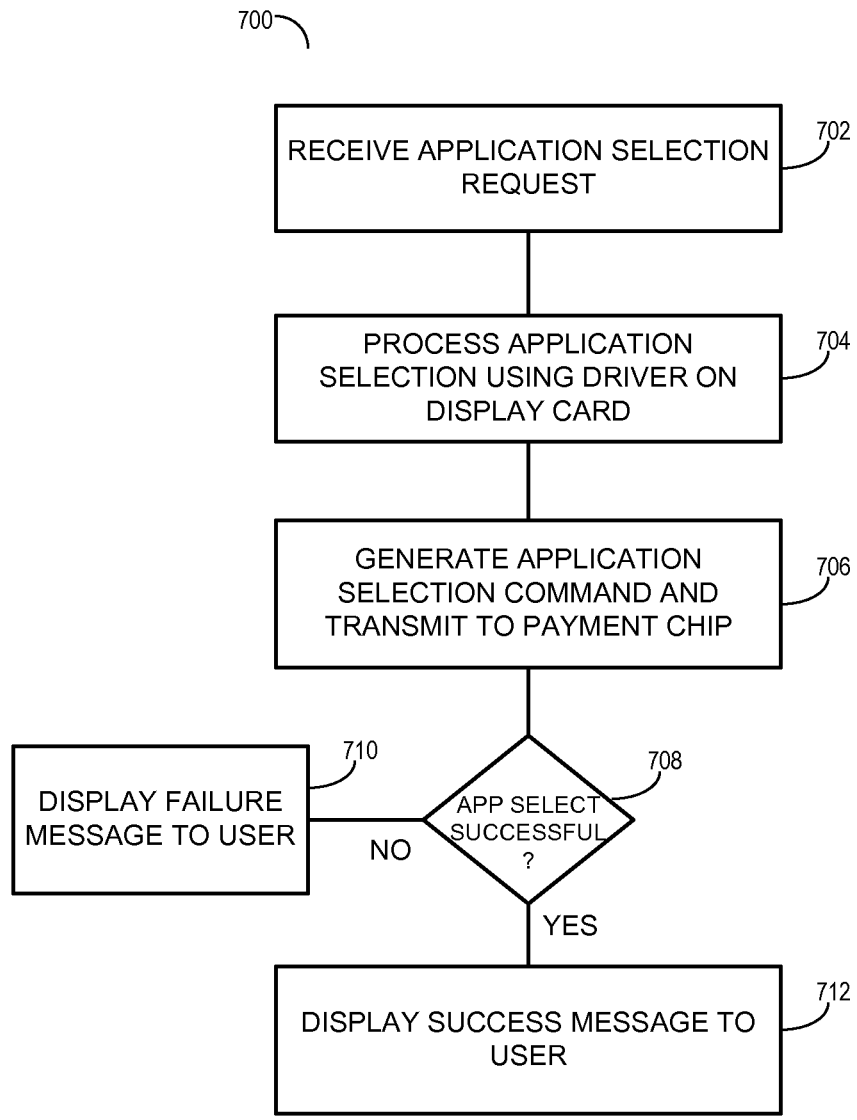
FIG. 7 is a flow diagram of an example application selection process conducted by a display card pursuant to some embodiments.

Once a selection of a desired application has been received by the display card 200, processing may continue at 704 where the driver 216 acts on the received selection to process the application selection. This processing may involve processing at 706 where the driver 216 generates a command or message to cause the application selection to occur in the payment chip or processor. For example, in an EMV environment, the driver 216 may generate an APPLICATION SELECT message which includes information identifying the application selected by the cardholder. Processing at 706 may also include transmitting the message (such as an EMV APPLICATION SELECT message) to the payment chip for processing. Such processing may include making the application the selected application for use in the current (or the next) transaction. The driver 216 (and or the payment application 214) may include validation processing to determine (at 708) whether the selected application is available on the display card 200. If the application is not available, processing may continue at 710 where a failure message or other prompt is displayed to the cardholder via display device 220. If the application selection is valid, processing may continue at 712 where a success message or other prompt is displayed to the cardholder via the display device 220. Such application selection processing may include the ability to select a variety of operation modes of the display card 200. For example, in embodiments where the display card 200 is a dual mode device (that is, the display card 200 may be operated in either a contact or contactless mode of operation), an application selection process such as shown in FIG. 7 may include an ability to select a mode of operation. For example, a cardholder may interact with an input device 240 to enable or disable a contactless mode of operation.

In some embodiments, the interaction between the driver 216 and the payment application 214 may be performed in a number of different ways. For example, as described in certain embodiments herein, the driver 216 may interact with the payment application 214 using standard EMV commands. In an application selection process, for example, the application selection may cause the rewriting of an EMV Payment System Environment ("PSE") variable to cause the selection of an application. As another example, a bespoke command may be created to cause an application to be enabled or disabled.

Figure 8:
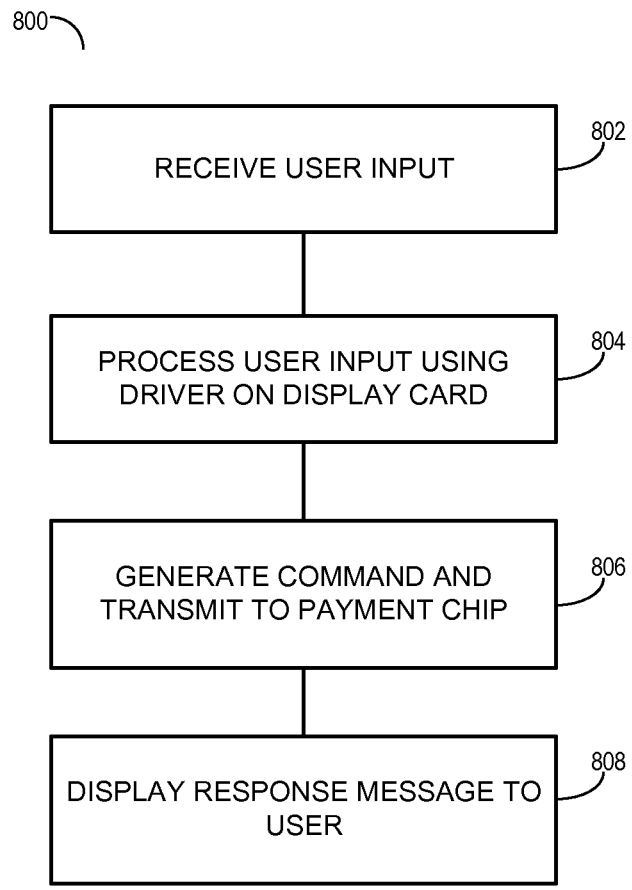
FIG. 8 is a flow diagram of an example transaction process conducted by a display card pursuant to some embodiments.

Reference is now made to FIG. 8 where an illustrative process 800 for allowing a cardholder to interact with features of a display card 200 is shown. Processing begins at 802 where a cardholder provides some user input by interacting with input device 240 (which may be in response to one or more prompts displayed on a display device 220). The user input is received by a driver 214, and at 804 the driver 214 processes the received information to perform an action. For example, as described herein, the action may be an application selection, a parameter reset, or other action involving a payment application 214 of the display card 200. The action is committed or communicated to the payment application 214 at 806 where the driver 216 generates a command based on the received input and transmits it to the payment application 214. Based on processing at 806, a message or response may be displayed to the cardholder to confirm the action (e.g., by providing a success or fail message or a prompt for further action).

In some embodiments, the display card 200 may operate in a "pull" model of operation to retrieve information for display to a user. For example, an application utilizing the display 220 and the input device 240 may proceed as follows. First, the display driver 240 may cause a message or prompt to be displayed to the cardholder on the display 220. For example, the message may prompt the cardholder to enter a selection of an application or a request for a balance, or the like. Next, the cardholder enters data in response to the request using the input device 240 and the driver 216 captures this data and transmits it to a chip or processor (such as an EMV chip). A standard EMV transaction then ensues between the driver 216 and the EMV chip (and, in some transactions, between the EMV chip and a reader device or terminal). The driver 216 then obtains the requested data from the EMV chip and displays the results to the cardholder using the display 220. That is, the cardholder's interaction is between the display 220/input device 240 and the driver 216, operating to pull information from the EMV chip and any involved reader or terminal.

In some embodiments, the display card 200 may operate to request application data from a remote payment network. For example, the cardholder may interact with the input device 240 and the display 220 (under control of the driver 216) to request information that is obtained from a remote payment network. For example, the cardholder may interact with input device 240 and display 220 to request that a loyalty application be activated or installed on the display card 200, and such a request may be transmitted to a reader or terminal device for transmission to a remote payment network. The payment network (or an issuer or other entity in communication with the payment network) may then respond with a message including a script executable by the display card to install and configure the requested application.

A similar flow may be used in conjunction with communication between the display card 200 and a merchant terminal. For example, the driver 216 in conjunction with the input device 240 and display 220 may prompt the cardholder for preference or other information and the data will be provided to an EMV application on the display card 200. The EMV application may set one or more preferences or other settings in response to the received input data and those preferences or other settings may control interaction of the display card 200 with merchant terminals. For example, the cardholder may set a preference (using display 220 and input device 240) that the cardholder prefers not to be asked about any cash advance in transactions at the merchant, or that the cardholder does prefer to opt in to any offers or loyalty benefits at the merchant.

Other applications or operations may be facilitated using features of the present invention. For example, embodiments may allow PIN or password changes to be performed on the display card 200, even when the display card is not in communication with a terminal or reader. Such a process may proceed as follows. First, the cardholder may be prompted (through display 220) to enter their old PIN or password. Then, the cardholder enters (through input device 240), a new PIN or password (and may confirm it in a second entry). The driver 216 operates to check or verify the old PIN or password (e.g., using an EMV "verify" command) and proceeds to perform a PIN change unblock transaction (EMV command number 29). Similar processing may be performed to conduct a PIN unblock pursuant to EMV, even where the display card 200 is not in communication with a reader or terminal device.

The display card 200 may also be operated to perform application selection processing (e.g., to cause the display card 200 to be operated in one or more application modes). In such embodiments, the cardholder may be presented with one or more options to select different application modes (e.g., by pressing one key on input device 240, the card may be put in a "debit card" mode of application). The driver 216 receives the application selection command and may cause the EMV application to be modified or set to operate in the selected mode of operation. In some embodiments similar processing may be used to deactivate or activate different applications (e.g., the contactless mode of communication may be deactivated or activated, or the like). Further, similar processing may be used to perform temporary delegation or authorization functions. As illustrative examples, the input device 240 and display 220 may be used to allow the cardholder to select a maximum number of offline transactions that may be performed, a floor limit to be reset, or the like.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:
1. A method, comprising:
  receiving, by a display card having an input device and a display device, a user input, said user input received via said input device, the display card also having a card-shaped body, the display device and the input device supported on the card-shaped body; said card-shaped body having a thickness of substantially 0.76 mm; said card-shaped body having a top area of substantially 85.60×53.98 mm with rounded corners having a radius of 2.88-3.48 mm;

processing, using a driver application on said display card, said user input;

generating, based on said user input, a command;

providing said command to an application on said display card for processing to affect an operating mode of said display card;

generating, by said driver application, a message for display on said display device; said message for display on said display device for prompting a user to input vehicle mileage data;

receiving in the display card a user input of said vehicle mileage data;

connecting the display card to a payment terminal in connection with a payment account transaction;

transmitting the received vehicle mileage data from the display card to a remote system in connection with the payment account transaction; and displaying to the user via the display device an indication that the display card has successfully transmitted the vehicle mileage data to the remote system.

2. A method, comprising:

receiving, by a display card having an input device and a display device, a user input, said user input received via said input device, the display card also having a card-shaped body, the display device and the input device supported on the card-shaped body; said card-shaped body having a thickness of substantially 0.76 mm; said card-shaped body having a top area of substantially 85.60×53.98 mm with rounded corners having a radius of 2.88-3.48 mm;

processing, using a driver application on said display card, said user input;

generating, based on said user input, a command;

providing said command to an application on said display card for processing to affect an operating mode of said display card; and generating, by said driver application, a message for display on said display device;

wherein said command places said display card in a PIN update operating mode, and said message for display on said display device is for prompting a user to enter an existing PIN to be updated;

the method further comprising:

receiving the existing PIN to be updated; and the driver application performing an EMV VERIFY command to confirm that the received existing PIN is correct.

3. A method, comprising:

receiving, by a display card having an input device and a display device, a user input, said user input received via said input device, the display card also having a card-shaped body, the display device and the input device supported on the card-shaped body; said card-shaped body having a thickness of substantially 0.76 mm; said card-shaped body having a top area of substantially 85.60×53.98 mm with rounded corners having a radius of 2.88-3.48 mm;

processing, using a driver application on said display card, said user input;

generating, based on said user input, a command;

providing said command to an application on said display card for processing to affect an operating mode of said display card; and generating, by said driver application, a message for display on said display device;

wherein said command places said display card in an operating mode to obtain installation of an application program on said display card from a remote payment network;

the method further comprising:

transmitting to the remote payment network a request for installation of the application program; and executing by the display card a script to install and configure the requested application program.

4. The method of claim 3, wherein said installed application program is a loyalty application program.

5. The method of claim 1, wherein said user input is a selection of an operating mode of said display card.

6. The method of claim 5, wherein said operating mode is one of a plurality of payment modes of operation.

7. The method of claim 1, further comprising:

transmitting, within said display card, EMV commands from said driver application to a payment application on said display card.

8. The method of claim 1, wherein said command places said display card in an operating mode in which data is transferred from an EMV chip on said display card to said driver application.

* * * * *